United States Patent [19]

Kröhling et al.

[11] Patent Number: 4,461,958
[45] Date of Patent: Jul. 24, 1984

[54] DRIVE SYSTEM AND METHOD FOR AUTOMOTIVE VEHICLES, ESPECIALLY FLOOR VEHICLES SUCH AS FORKLIFT TRUCKS

[75] Inventors: Erich Kröhling, Reinbek; Manfred Kremer, Hamburg, both of Fed. Rep. of Germany

[73] Assignee: Still GmbH, Hamburg, Fed. Rep. of Germany

[21] Appl. No.: 298,738

[22] Filed: Sep. 2, 1981

[30] Foreign Application Priority Data

Sep. 5, 1980 [DE] Fed. Rep. of Germany ....... 3033541

[51] Int. Cl.³ .................. B60L 11/02; H02P 5/16; H02P 5/00; H02P 5/46
[52] U.S. Cl. ...................................... 290/45; 290/51; 318/99; 318/335; 318/336; 322/15
[58] Field of Search ............. 290/45, 51, 40 R, 40 A, 290/40 B, 40 C, 40 F; 318/358, 335, 139, 99, 143, 154, 356; 417/45; 60/715; 187/9 R; 322/15; 246/182 R, 187 R

[56] References Cited

U.S. PATENT DOCUMENTS

| | | | |
|---|---|---|---|
| 3,107,304 | 10/1963 | Fagel | 290/45 |
| 3,109,130 | 10/1963 | Cheng et al. | 318/99 X |
| 3,162,793 | 12/1964 | Mason | 318/99 X |
| 3,263,142 | 7/1966 | Adoutte et al. | 318/99 |
| 3,370,218 | 2/1968 | Merz | 322/15 |
| 3,435,325 | 3/1969 | Laudel, Jr. | 322/15 |
| 3,499,164 | 3/1970 | Fevre et al. | 290/45 X |
| 3,699,418 | 10/1972 | Sasabe et al. | 318/335 X |
| 4,135,121 | 1/1979 | Stuhr | 318/335 X |
| 4,361,788 | 11/1982 | Melocik | 318/99 X |
| 4,373,150 | 2/1983 | Ritter | 318/336 |

OTHER PUBLICATIONS

"An Earthmoving Vehicle with a Thyristor DC Propulsion System," Dr. L. A. Schlabach and R. H. Osman, Robicon Corporation, IAS Annual Meeting, 1980, Cincinnati, Ohio.

*Primary Examiner*—J. V. Truhe
*Assistant Examiner*—Terry Flower
*Attorney, Agent, or Firm*—Karl F. Ross; Herbert Dubno

[57] ABSTRACT

A drive system for an automotive vehicle, especially an industrial floor vehicle such as a forklift truck, comprises an internal combustion engine, preferably a diesel engine, whose speed-controlling element (e.g. fuel-injection pump) in connected to a speed-setting member (e.g. a drive pedal) and propels an externally energized direct-current generator which, in turn, is connected to an externally energized direct-current motor driving the load, e.g. at least one wheel of the vehicle. According to the invention, the speed-controlling element of the internal combustion engine is provided with a speed-setting signal generator, the output shaft of the internal combustion engine with an engine shaft-speed signal generator and the output shaft of the direct current motor with a motor shaft-speed signal generator. The signals from the speed-setting signal generator and from the motor speed signal generator are fed to a speed controller whose output is delivered to a power controller while the signals from the speed-setting signal generator and form the engine shaft speed signal generator are delivered to a comparator hose output is also supplied to the power controller which controls the field-coil excitation of the direct current generator.

22 Claims, 2 Drawing Figures

DRIVE SYSTEM AND METHOD FOR AUTOMOTIVE VEHICLES, ESPECIALLY FLOOR VEHICLES SUCH AS FORKLIFT TRUCKS

FIELD OF THE INVENTION

Our present invention relates to a propulsion control system for automotive vehicles and, more particularly, to floor-type industrial vehicles such as forklift trucks. The invention also relates to a method of controlling or operating such vehicles and to circuitry for this purpose. Specifically, the invention relates to the control of drive systems of the type in which an internal combustion engine drives a direct current generator and the electrical output from this generator is used to drive an electric motor which can be coupled to a load, e.g. the vehicle wheels. Such systems can be referred to as engine/generator/motor sets.

BACKGROUND OF THE INVENTION

Engine/generator/motor sets have heretofore been provided in a variety of applications and, in one field of application of such power sets, the internal combustion engine is a diesel engine, the generator is a direct current generator and the motor is a direct current motor.

Such drive systems can be used to propel industrial vehicles, especially floor vehicles such as forklift trucks.

With such vehicles, a drive pedal serves as a set point input for the internal combustion engine which, in the case of a Diesel engine, can have a fuel-injector pump serving as the speed-setting element. The speed-setting element is thus connected to the drive pedal or setpoint member.

The direct-current generator which is driven by the output shaft of the internal combustion engine can be of the externally energized type and the direct current motor can also be externally energized and connected to at least one wheel of the vehicle.

In such drive systems, it is customary in controlling the vehicle speed to either set the internal combustion engine to the desired speed, to selectively control the direct current generator, or to selectively control the current flow to the motor or the energizing field for the motor. This field may be supplied by a vehicle battery or from a supply network connected to electrical means. Customarily only one of these selectively controllable actions is required to adjust the vehicle speed.

Consequently, all of these systems apply techniques long known in the control of engine or electric motor systems, i.e. to regulate the speed of the engine or, where appropriate, the current flow or field energization of a drive motor.

Such systems, while effective for stationary applications and under other clearly determined operating conditions in which the actual speed is invariably a function of the pedal position, may not always be satisfactory.

There are occasions when problems have been encountered with such systems, some of which are more noticeable than others. For example, in a vehicle whose speed is exclusively controlled by the accelerator pedal, for example, the maintenance of the pedal in a fixed position may result in changes in the vehicle speed as a result of variations in the terrain or conditions encountered by the vehicle wheels. Thus, for instance, when the vehicle climbs hills or travels downwardly along an incline, the speed of the vehicle may change markedly in spite of the fact that the accelerator pedal is held in place.

For many vehicles it is crucial to be able to have extremely fine control of the actual speed of the vehicle and, indeed, to determine or establish this speed precisely, both when the position of the speed-control pedal is held constant a and when the travel resistance can change markedly.

This is especially the case for floor-type industrial vehicles, e.g. forklift trucks. Such vehicles are often called upon to transport especially sensitive equipment and articles as in the case of pallets loaded with glass bottles or flasks containing combustible or toxic liquids, and in such cases and for sensitive electronic equipment or the like it is absolutely essential that an extremely fine and sensitive control be provided during transportation, pickup and deposit of the load.

It has already been proposed to provide a vehicle drive including an internal combustion engine which acts upon a stepless, generally hydrostatic, transmission and in which the accelerator pedal produces a signal which affects the setting of the steplessly adjustable variable-ratio transmission.

In this system, a further signal can be generated to represent the speed of the internal combustion engine and still another signal can represent the load applied to the transmission, these signals being processed with the signal from the accelerator pedal (see German Patent Document DE-OS No. 20 49 048).

In this arrangement, however, the internal combustion engine speed signal and the transmission load signal do not provide continuous effects upon the setting of the steplessly adjustable transmission but rather form limiting signals for controlling the acceleration and, therefore, preventing excessive acceleration which would carry the signals beyond certain limits.

U.S. Pat. No. 4,135,121, moreover, discloses a vehicle drive system in which the vehicle is propelled by a battery-fed externally excited electric motor through a steplessly variable hydrostatic transmission. In this case, the excitation of the shunt wound motor is made dependent upon the load upon the stepless transmission. In this case as well, the setting of the transmission on the one hand and the setting of the prime mover or propelling motor on the other can be independent and only under certain conditions will be superimposed one on the other or correlated.

OBJECTS OF THE INVENTION

It is the principal object of the present invention to provide a motor-control system, especially for an engine/generator/motor propulsion set, whereby disadvantages of earlier systems are obviated.

Another object of this invention is to provide a control system for such a drive set, especially for controlling the speed of a floor-type industrial vehicle such as a forklift truck, to allow finer control of the speed of the vehicle than has hitherto been possible.

Still another object of the invention is to provide a system for the purposes indicated which also will preclude overloading of the internal combustion engine by an excessive torque at the shaft of the direct current generator.

It is a further object of the invention to provide a method of controlling an engine/generator/motor set so as to improve the sensitivity of speed regulation at the output shaft thereof while precluding overloading within the drive set.

SUMMARY OF THE INVENTION

These objects and others which will become apparent hereinafter are attained, in accordance with the present invention, in a control system and method for an engine/generator/motor power set, especially for the sensitive and fine-control speed regulation of an automotive vehicle, e.g. an industrial floor vehicle such as a forklift truck, where the power system comprises an internal combustion engine, preferably a diesel engine, having a speed-setting member such as an accelerator pedal. In the diesel engine, the speed-control element is a fuel-injection pump. The engine output shaft, i.e. crankshaft, of the diesel engine is connected to the externally excited direct current generator and the direct current generator is electrically connected to an externally excited direct current motor which is coupled with a load, e.g. with the wheels of the vehicle.

According to the principles of the present invention, the speed-controlling element of the internal-combustion engine is provided with a speed-setting signal generator and the output shaft of this engine is provided with an engine speed signal generator. The shaft of the direct current motor is provided with a motor speed signal generator and the signals of the speed-setting signal generator and the motor speed signal generator are fed to a speed controller whose output signal is fed to a power controller. The signals of the speed-setting signal generator and the engine speed signal generator are applied to a comparator and the output of this comparator is also applied to the power controller. The power controller regulates the electric current through the field winding of the direct-current generator, i.e. varies the field excitation of the generator.

In the event the speed of the output shaft of the direct-current motor deviates from a setpoint value for the latter, a difference will be developed in the speed controller by comparison of the signals delivered thereto, the difference signal being applied to the power controller. This difference signal is effective to vary the excitation of the direct current generator to modify the electric current transmitted to the direct current motor in the sense that the shaft speed of the latter and the vehicle speed are restored to the setpoint values.

The signal produced by the speed-setting signal generator corresponds to the speed of the internal combustion engine in an unloaded state for this setting of the speed-control element, i.e. the fuel injection pump.

If the torque applied to the direct current generator increases to a level at which this torque tends to depress the speed of the internal combustion engine from the speed corresponding to the setting of the speed-control element, by a significant degree below that established by the latter element, a difference signal will be developed in the comparator between the signals of the speed-setting signal generator and of the engine speed signal generator and this difference signal will be applied to the power controller to vary the excitation of the direct current generator in a sense tending to reduce the torque developed and applied to the latter until the engine speed signal generator is restored to a value within a predetermined tolerance range corresponding to the set position of the speed control element and the corresponding predetermined engine speed.

By appropriate choice of the various circuits and control elements utilized as the integrator, speed controller, power controller and field-excitation current controller at installation of the control system or by making the same of variable or controllable design so that they may be adjusted during operation, we are able to obtain a vehicle drive system which has excellent characteristics capable of ensuring, for example, that the vehicle speed will always be proportional to the setting of the accelerator pedal and independent of driving resistance, inclines or the like.

In other words, for a given position of the accelerator pedal, the acceleration is predetermined and overload protection of the internal combustion engine is nevertheless guaranteed.

It is also possible to establish the operating characteristics at practically any desired level or pattern. For example, it is possible with the system of the present invention to obtain motor and engine characteristics which combine the advantages of hydrostatic transmissions with those of hydrodynamic drives.

In general, the system of the invention represents a vast improvement over conventional diesel electric drives utilizing series-wound electric motors.

The control process is of a priority nature, permitting speed control with subordinated current control and even further subordinated power control. The circuitry of the various elements according to the invention establishes limits for traction forces, vehicle speed and acceleration and permits the input power and the output power of the internal combustion engine to be established in predetermined relationships without difficulty.

The vehicle drive can operate in a four-quadrant mode, i.e. forward and backward and with acceleration and deceleration, optimally controlled, in each direction. In utility vehicles, especially lifting vehicles such as forklift trucks, there are special operating conditions, e.g. during the lifting of the fork or of a boom or beam, in which the internal combustion engine is operated at a higher speed although the direct current generator for vehicle drive has no power output or is only generating a relatively small power output.

Under these conditions, it is possible to provide speed control elements for the internal combustion engine with no direct affect upon the accelerator pedal but which can vary with the engine speed.

When the speed-setting signal generator is associated with the accelerator pedal, the signal from the latter does not always represent the setting of the internal combustion engine, especially when between the accelerator pedal and the speed-controlling element of the internal-combustion vehicle, a non-positive kinematic motion transfer linkage is provided.

This problem can be overcome, in accordance with the present invention, by providing a speed-setting signal generator directly in connection with the accelerator pedal, this signal generator (being hereinafter referred to as a pedal-setting signal generator) serving as a direct setpoint value generator.

In this case, the signal from the pedal-setting signal generator is delivered to the speed controller while the signal from the speed-controlling element, i.e. from the speed-setting signal generator, is delivered to the comparator for the comparison with the motor shaft speed while the engine speed signal generator delivers its signal together with the signal from the speed-setting signal generator to the comparator which supplies its difference signal directly to the power controller.

It has been found to be advantageous, moreover, to provide between the speed controller and the power controller, a current controller. The current controller receives an input which is in the form of a signal representing the current flowing between the direct current generator and the direct current motor. A feedback path can also be provided from this current sensor which can be a magnetoresistive device, to a motor field current controller which, obviously, controls the field current in the motor. The current controller can limit, upon attaining a threshold value of the measured current, the signal delivered to the power controller.

The current controller also serves to limit the maximum armature current in the direct current generator and since this armature current is also the armature current in the direct current motor, limits this as well.

In yet another feature of the invention, the signal from the pedal-setting signal generator is monitored to determine rapid changes therein and, in accordance with the invention, is fed to an integrator forming part of the speed controller. In this case, if the accelerator pedal is suddenly depressed so that a rapid change in the excitation field current will result in an impermissibly high armature current, the signal will be diminished or increased by integration in accordance with the predetermined program to prevent excessively high current flows in the direct-current generator or the direct-current motor while nevertheless allowing the speed of the direct-current motor shaft which is desired to be rapidly achieved.

The function of the integrator can be effected in accordance with a predetermined program and can be altered simply by changing this program. The programmable nature of the integrator has been found to be advantageous when one and the same drive system is utilized for various vehicles and under various conditions.

Most advantageously, the integrator can be set manually upon incorporation of the system in a vehicle.

A variation in the rate of change of the signal has the effect of changing the vehicle acceleration rate so that maximum vehicle accelerations or decelerations can be established and the driver's panel of the vehicle can be provided with levers for setting rough, hard, dry or other driving or road conditions to modify the integrator response rate accordingly. Values thus can be set differently under these travel conditions from those which apply to wet, slippery surfaces.

According to still another feature of the invention, the change function of the integrator can be made automatically dependent upon a signal depending upon the axle laod of the wheels driven by the direct-current motor so that with excessive axle loads and high friction between the wheel and the travel surface a greater acceleration is used, although with less loaded axle and thus with greater slip, the danger of skidding or non-gripping of the wheels is reduced.

The variability of the integrator under the control of the driver or automatically has also been found to be advantageous because it allows varying loads to be transported with different sensitivities and thus the system can transport cast ingots on the one hand or sensitive thin glass flasks containing combustible or toxic liquids on the other.

The vehicle is provided with circuitry enabling its forward and rearward travel. This circuitry, of course, is responsive to a travel direction selector functioning as a signal generator for producing the direction-selection signal. While the direction-signal generator may be associated with the position of the accelerator pedal it has been found to be more advantageous to provide this signal generator as a separate element whose input is applied to the integrator and which affects the polarity of the output signal of the latter.

It has also been found to be desirable to feed the signal from the power controller to a circuit which is connected to the field coil of the direct current generator and regulates the current through this field coil to thereby control the excitation of the direct current generator.

This circuit has the function of transforming the input signal, which may be in the form of a voltage level, to a current pulse whose duration or whose "off" time is determined in response to the input voltage signal and, in turn, control the field excitation. This element, of course, provides pulse control of the direct-current generator.

In yet another feature of the invention, the final stage between this latter circuit and the field coil is polarity responsive and serves to energize the field coil selectively in either of two directions for selecting the direction of travel of the vehicle and thus the direction of rotation of the motor.

Thus the output from the power controller can be effective depending upon the absolute magnitude of its output signal and not a polarity thereof, the polarity of this output signal which is applied to the final stage being established by a switching circuit controlled by, for example, the output from the current controller.

According to the invention, the engine speed signal generator may be a pulse-transmitting generator of the rotary type in which the transduction between rotary movement and electrical output is effected either in terms of an alternating current or in terms of a sequence of light pulses which are transformed into corresponding electrical signals. It thus may have a continuous output which is a function of the speed of the engine or a pulse train whose frequency is a function of the engine speed. The engine can be formed with a flywheel having teeth which can form part of a pulse generator and, more generally, mention may be made of the fact that the engine speed signal generator can be a device utilizing exisiting parts of the engine. In the preferred mode of operation in accordance with the invention, the output of this signal generator should be a voltage signal and in the case where a pulse generator is used to measure the rate of rotation of the engine shaft, a frequency/voltage converter should be provided between this pulse generator and the circuit to which the engine shaft's speed signal is applied.

The pedal-setting signal generator can be provided in various configurations as well. For example, it can include a differential field plate sensor, e.g. a magnetoresisitve or galvanomagnetic device, fixed to the vehicle frame and affected by a magnet connected with the pedal. This signal generator can, however, be a device which selectively intercepts a light beam from a constant light source directed to a light-sensitive element such as a photodiode.

Advantageously, between the converter circuit and the field coil, a final stage is provided in the form of a bridge network of power transistors, rendered conductive in pairs, with collector emitter networks bridged by respective diodes.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
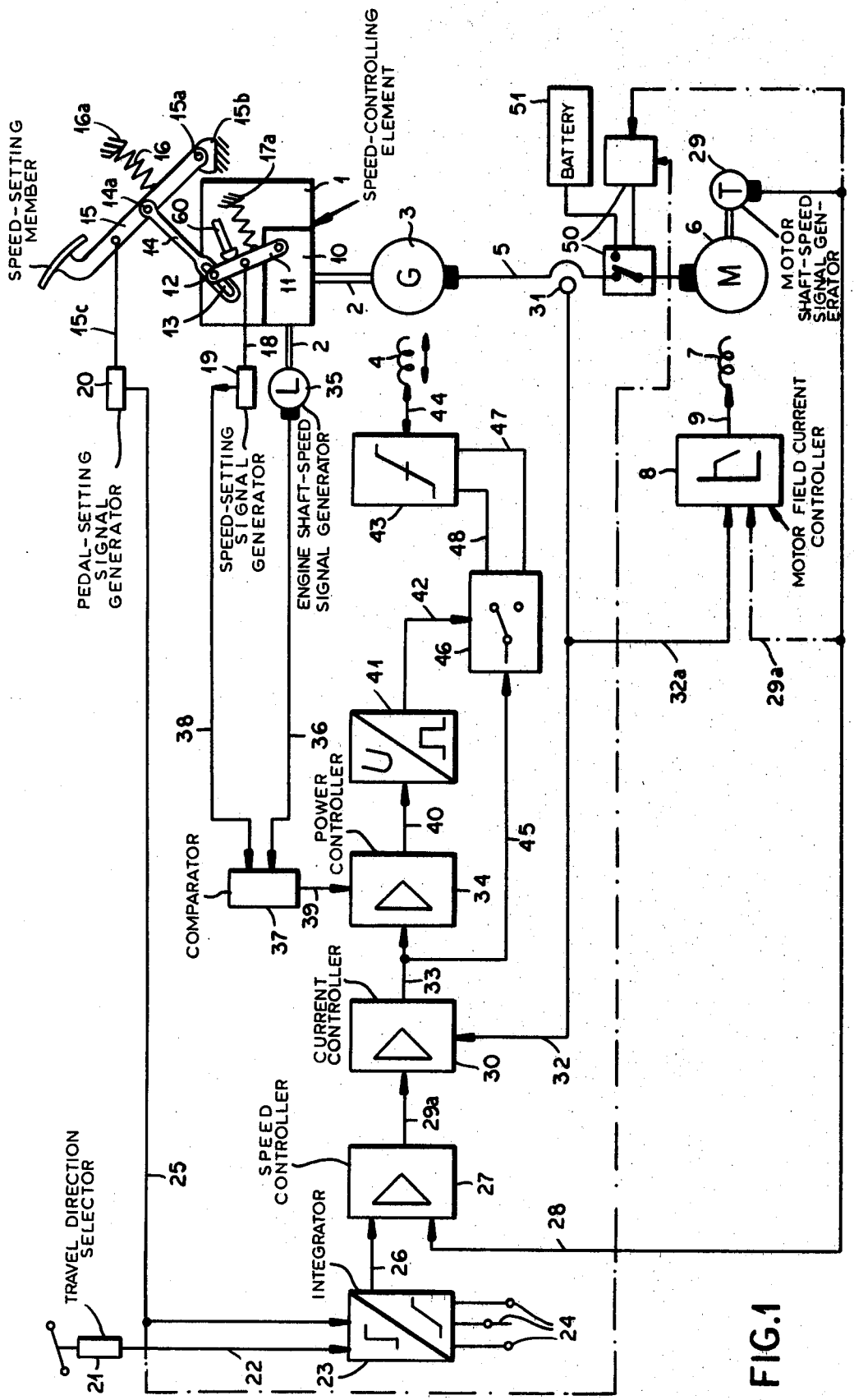
FIG. 1 is a circuit diagram and mechanical-connection diagram of an engine-generator-motor drive system embodying the present invention.

In FIG. 1, we have shown an internal combustion engine, preferably a Diesel engine 1, whose crankshaft forms the engine output shaft. This engine output shaft drives an externally excited direct current generator 3, 4 element 3 representing the rotor while element 4 represents the field winding of this motor.

The actual current supply to the field coil 4 is discussed in detail in connection with FIG. 2 and is represented only diagrammatically in FIG. 1.

Conductors 5 connect the generator 3 to a direct current electric motor 6, 7 which is externally excited and has an armature 6 and a field winding 7.

The field winding 7 of the motor is excited by a current flow through a conductive path represented at 9 by a motor field current controller represented at 8.

The Diesel engine 1 is provided with a fuel injection pump 10, constituting the speed-controlling element of this engine. This speed-controlling element is varied in its output by a lever 11, one end of which is connected by a lost motion linkage 12, 13 to the rod 14 which is pivotally connected to the accelerator pedal 15 of the vehicle. The accelerator pedal constitutes a speed-setting member according to this disclosure.

More specifically, the pedal 15 is pivotally connected at 15a to the vehicle chassis 15b and is biased upwardly and in the clockwise sense by a transmission spring 16, anchored at 16a to the chassis. The rod 14 is pivotally connected to the pedal 18 at 14a and, at its free end, has a slot 13 in which a pin 12 is slidably received to form the lost motion linkage with this slot. Pin 12 is carried by the lever 11. A further tension spring 17, connected to the chassis at 17a, can bias the lever 11 upwardly, i.e. in its clockwise sense.

The lever 11 is connected via a link rod 18 with a speed-setting signal generator, e.g. in the form of a potentiometer measuring the position of member 11 and hence the setting of the speed-controlling element. The output of the potentiometer, constituting a position-measuring signal generator, represents a setpoint signal for the engine speed. In other words, for every setting of the speed-controlling element 10, there is a predetermined engine speed which ought to be attained and measurable at the crankshaft 2 of the engine 1.

The use of the potentiometer as a position-measuring device for this purpose is described at *Servomechanism Practice*, McGraw-Hill Book Company, New York, 1960, pp 44ff, together with the output signals which are developed.

The accelerator pedal 15 is connected by a link rod 15c with an accelerator pedal setting signal generator 20 which can also be in the form of a potentiometer (see *Servomechanism Practice*, op. cit.).

Selection of the direction of travel is effected by a selector 21 whose signal is applied via line 22 to an integrator 23 connected to an electric current supply source represented at 24. The integrator can be of the type described in *Operational Amplifiers*, McGraw-Hill Book Company, New York, 1971, pp 213ff.

The signal from the pedal-setting signal generator 20 is also applied to this integrator via line 25 and the output signal of the integrator is delivered via line 26 to a speed controller 27.

The latter also receives an input 28 representing signals from a tachometer 29 (see pages 315ff of *Servomechanism Practice*, op. cit.) connected to the output shaft of the motor 6, 7 and hence to the load (not shown) which may be one or all of the wheels of the vehicle. Tachometer 29 thus represents a motor shaft-speed signal generator. This speed controller 27 can include a comparator (see pages 358ff of *Operational Amplifiers*, op. cit.) which compares the signals delivered at 26 and 28 to deliver via line 29a a difference signal to a current controller 30.

The electrical current passing through lines 5 between the generator 3, 4 and the motor 6, 7 can be detected by a current sensor 31 so that a signal corresponding to the current flow is delivered at 32 to the current controller 30 in a feedback loop which also is connected to the motor field current controller 8 previously mentioned via line 32a. The output signal from the current controller is delivered at 33 to a power controller 34.

The shaft 2 is also connected to a tachometer or other engine shaft-speed signal generator 35 from which a signal representing the crankshaft speed of the engine is delivered via line 36 to the comparator 37 which also receives an input 38 from the speed-setting signal generator 19.

In the comparator 37 these signals are compared and the deviation or difference signal is applied at 39 to the power controller 34.

The output signal from this power controller is delivered at 40 to a converter 41 and the output of the latter is fed via line 42 and a switching circuit 46 (represented schematically) to a final stage 43 which controls the excitation of the field coil 4 of the direct current generator 3, 4.

From line 33 between the current controller 30 and the power controller 34 a branch line 45 runs to the switch 46 and, depending upon the polarity of the signals in line 33 and in line 45, energizes the final stage 43 through either line 47 or line 48.

Figure 2:
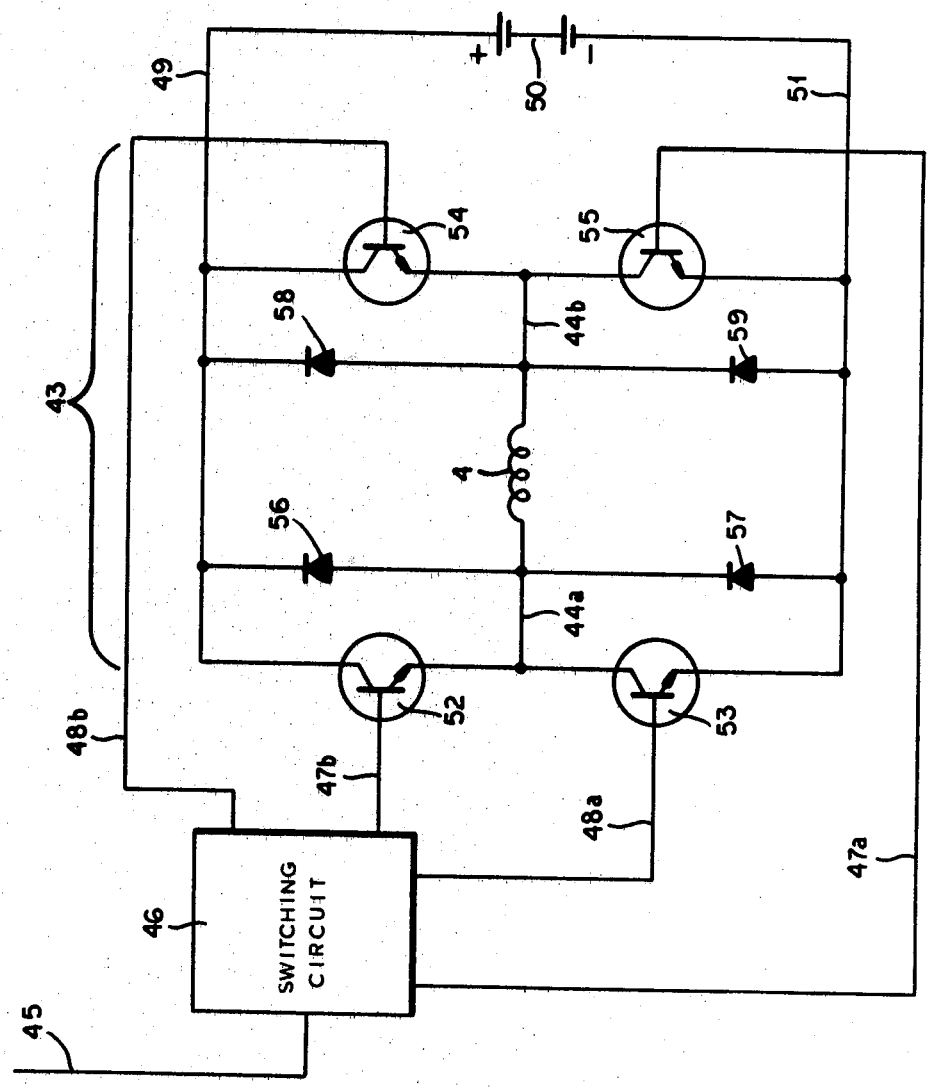
FIG. 2 is a circuit diagram of the final stage thereof.

The final stage of the circuit of FIG. 1 has been shown in greater detail in FIG. 2 and comprises positive and negative busses 49 and 51 connected to a battery 50 which can be the vehicle battery or a special battery provided for supplying the circuitry described.

The circuit 43 also comprises four power transistors 52, 53, 54, 55 connected in a bridge circuit between these busses and the field winding 4 of the direct current generator.

A diode 56, 57, 58 or 59 is bridged across the emitter-collector network of the respective transistors 52, 53, 54, 55 so that, in effect, the transistors shunt the dials which are in rectifier bridge configuration. The bases of the transistors 52 and 55 are connected to line 47 here shown divided, for convenience, into lines 47a and 47b. Similarly, the transistors 53 and 54 which are switched alternately with the transistors 52, 55 by the switching circuit 46 are energized via line 48 here represented as lines 48a and 48b.

From the drawing it will be apparent that a signal on lines 47a, 47b will render conductive transistors 42 and 55 causing the current from the positive blocks 49 to flow through the excitation coil 4 from left to right. Similarly energization of lines 48a and 48b will cause transistors 54 and 53 to become conductive for reverse flow through the field winding 4 via the conductors 44a, 44b.

Thus depending upon the switching state of the switch 46, which can be any conventional electronic switch, the current flow through the field winding 4, is in one or the opposite direction so the field is polarized in one sense or the other to determine the direction of rotation and hence the travel direction of the vehicle.

The current measuring device or sensor 31 supplies the measured plate signal of the current (actual value signal) in the form of a direct-current voltage.

To this end the current detector may be a differential field plate sensor (see *Galvanomagnetic Devices Data Book*, 1976/77 Siemens AG, Munich, Germany)

The slider of the potentiometer 19 is angularly displaced in proportion to the displacement of lever 11 and supplies a direct current voltage proportional to the position of this lever 11. The magnitude of this voltage is a measure of the speed rate internal combustion engine in its solid state. Light-operated rate generator 35 supplies an output whose frequency is proportional to the rotary speed of the crank shaft of the engine and which is transformed in a frequency/voltage converter to a voltage proportional to engine speed. This voltage is thus a signal representing the actual value of the speed of the internal combustion engine 1.

As noted, the accelerator pedal 15 is connected by the linkage 14, 11 with the speed controlling element of the internal combustion engine 1.

A field plate sensor, e.g. a magnetoresistive device as described in *Galvanomagnetic Devices* can be used as the sensor 20 or can be fixed to the latter and can cooperate with a magnet which is displaced by the accelerator pedal 15 so that the voltage outputted by this magnetoresistive device is a voltage representing the setting or position of the pedal 15 and hence a setpoint value for the vehicle speed.

A plunger 60, which is used in a utility vehicle such as a forklift truck provided with the system of the invention, can be provided to actuate the lever 11 in a sense tending to swing the latter in a counterclockwise direction and shift the speed-controlling element 10 of the vehicle in the direction of greater power output when some additional power demand is required for the lifting operation but no change in vehicle speed is desired.

Of course, under these circumstances, a corresponding signal will develop at the speed-setting signal generator 19.

The electrical signal from the tachometer 29, which represents the engine speed, is also in the form of a direct current voltage and represents the actual value of the electric motor speed. Consequently, setpoint values and actual values for the speed of the direct current motor 6, 7 are compared in the speed controller 27.

The function of the power controller 34 is summarized below:

The speed-setting signal generator 19 supplies, as has already been noted, a voltage which is a measure of the speed of the unloaded engine, i.e. the nominal engine speed without loading, for a given position of lever 11 and setting of the speed-controlling element 10. This speed is the speed which the shaft 2 would achieve if completely disconnected from the load and represents the maximum speed of the shaft for the given setting of the lever 11.

This signal in the form of a voltage is compared with the instantaneously measured speed of the engine in the form of the signal from the engine shaft speed signal generator 35, the difference at 39 being a signal represnting the drop in the speed of the engine below the setpoint value resulting from loading. This difference signal is applied to the power controller 34.

The circuit 41 is a converter which transforms the output voltage of the power controller into rectangular pulses of variable on-time between 0 and 100% while the final stage 43 is the aforementioned bridge circuit with the requisite bridge halves 52, 55 or 54, 53 being activated alternatively.

The excitation current in the field winding 7 of the motor 6,7 is controlled by feedback in accordance with the armature current through lines 5 between 50% and 100% of the current maximum. Thus, the field current controller 8 functions similarly to the converter 41 to provide pulses of a duration between 50% and 100% and independently of the polarity of the signals in line 43 and from the polarity of excitation of the field winding 4. An advantage of this type of control is reduced heating of the field winding and hence a greater speed range between partial and full loading.

It is also possible in accordance with the invention to make the current regulator for the field coil 7 dependent upon or independent of other signals. For example, it has been found to be advantageous in some cases to permit the controller 8 to respond to the output of the motor speed signal generator 29 as represented by the dot-dash line 29a.

The control operation is best illustrated by detailing several operating modes. For example, upon acceleration, the direction of travel is selected by the selector 21 and the accelerator pedal 15 is depressed to establish a stepoint value for the vehicle speed via the signal generator 20 which vehicle speed setpoint is applied via line 25 to the integrator 23 and thence to the remainder of the speed controller. The amplification factor may be 1500 and hence any changes in acceleration as determined by movement of the pedal will result in practically complete control in acceleration of the vehicle.

The current controller 30 and the power controller 34 are similarly operated and the generator 3,4 is excited so that a current flows in the armature 3 and is delivered to the motor, this armature current amplitude being measured by the current sensor 31 whose output is applied to the current controller 30. When the maximum value of the armature current is reached, the current controller operates via the final stage to reduce the current or prevent excess armature current.

If the loading of the internal combustion engine 1 results in a drop of its speed, the power controller 34 is rendered effective by the output from comparator 37 and controls the current traversing the field coil 4 so that the engine is not overloaded.

When the speed of the vehicle reaches a speed corresponding to the setting of the pedal 15, the speed control function is resumed by the speed controller 17 which retains the desired speed at the output shaft of motor 6,7 and hence the desired vehicle speed.

If the operator backs off on the pedal intending to reduce the vehicle speed, the control by regulator 27 is in the opposite sense and the motor speed signal generator 29 will have an output greater than the output of the signal generator 20 connected to the speed-setting element.

The current controller 30 now operates in the reverse sense and the drive brakes with the braking moment being applied to the engine. In this braking state the motor 6,7 functions as a generator and the generator as a motor.

When the motor speed signal generator 29 provides an actual value signal which is greater than the setpoint speed signal of the engine produced at 20, i.e. when the setpoint signal is smaller than the actual value signal, a circuit represented at 50 can interrupt the conductive path 5 and electrically isolate the generator from the motor and allow the motor, now acting as a generator, to store electric current in a battery with a drop between the motor and the battery terminal sufficient to ensure a braking action.

For high accelerations, the battery 57 can be additionally connected with the armature 3 to the battery to increase the current flow through the latter.

We claim:

1. A control system for an engine/generator/motor set for a vehicle propelled by said set, said set comprising:
   an internal combustion engine having a speed-controlling element;
   a speed-setting member operatively connected to said speed-controlling element, said engine having an output shaft;
   an externally excited electric current DC generator connected to said output shaft; and
   an externally excited DC electric motor electrically connected to said electric current generator and having a motor shaft connected to a load for propelling said vehicle, said control system comprising:
   a speed-setting signal generator connected to said speed-controlling element for generating signals representing a setpoint value of no-load engine speed determined by the position of said speed-controlling element;
   an engine shaft-speed signal generator connected to said output shaft and generating signals representing the speed of said output shaft;
   a motor shaft-speed signal generator connected to said motor shaft and generating signals representing the speed thereof;
   a speed controller receiving signals from said speed-setting and motor shaft-speed signal generator and having a speed-controller signal output;
   a power controller receiving said speed controller signal output as an input thereto;
   a comparator receiving signals from said engine shaft speed and speed-setting signal generators, said comparator being connected to said power controller and supplying an input thereto; and
   means connected to an output of said power controller for controlling the excitation of a field coil of said electrical current generator.

2. The control system defined in claim 1, further comprising means for detecting electrical current flow between said electrical current generator and said motor for producing a feedback signal and for applying said feedback signal to said power controller.

3. The system defined in claim 2, further comprising means for controlling the current flow through a field coil of said motor.

4. The system defined in claim 2 or claim 3 wherein the current flow through a field coil of said motor is controlled in response to current flow between said electrical current generator and said motor.

5. The system defined in claim 1 wherein said speed-setting signal generator is controlled at least in part by said speed-setting member.

6. The system defined in claim 1 further comprising a current controller disposed between said speed controller and said power controller, said current controller being fed with the output signal of said speed controller and a signal respective to the amplitude of current flow between said electrical current controller limiting the signal delivered to said power controller upon attainment of a limiting value of a signal representing measurement of the current between said electrical current generator and said motor.

7. The system defined in claim 5 wherein said speed-setting member is an accelerator pedal and is provided with a pedal-setting signal generator connected through a variable program integrator to said speed controller.

8. The system defined in claim 7, further comprising means for varying the polarity of the signal outputted to said speed controller in accordance with the selected direction of travel of the vehicle.

9. The system defined in claim 1, further comprising a converter circuit between said power controller and the field coil of said generator.

10. The system defined in claim 9 wherein a polarity responsive switch is provided between said converter and a final stage controlling the energization of the field coil of said electrical current generator.

11. The system defined in claim 10 wherein said switch is connected to respond to the output polarity of the signal from said current controller.

12. The system defined in claim 1 wherein said engine shaft-speed signal generator is a pulse generator, further comprising a frequency/voltage converter between said pulse generator and said comparator.

13. The system defined in claim 5 wherein said pedal-setting signal generator is a galvanomagnetic device.

14. The system defined in claim 1 wherein the last-mentioned means includes a bridge circuit with four power transistors energized in pairs depending upon signal polarity.

15. A method of operating an engine system including an internal combustion engine, an externally excited direct-current generator connected to this engine, an externally excited direct-current motor electrically connected to said generator and a setpoint element for controlling the speed of said engine, comprising the step of exciting said direct-curent motor with an electric current controlled by a signal determined by the armature current thereof, the current control being subordinated to a speed control.

16. The method defined in claim 15, further comprising controlling the power at said generator and subordinating the current control thereto.

17. The method defined in claim 16 wherein the power controller is subject to maximum value limiting control.

18. The method defined in claim 17 wherein setpoints at actual value speed signals are generated, compared and utilized to control the excitation current through a field coil of said generator.

19. The method defined in claim 18 wherein the result of the comparison is superimposed upon a further comparative value resulting from a comparison of the setpoint speed of the engine and an actual value thereof.

20. The method defined in claim 17 or claim 18 wherein the armature current dependent signal is subordinated to the signal of the first mentioned comparison.

21. A method of operating an engine/generator/motor drive comprising:

an internal combustion engine having a speed-controlling element;

a speed setting member operatively connected to said speed-controlling element, said engine having an output shaft;

an externally excited electric current DC generator connected to said output shaft; and an externally excited DC electric motor electrically connected to said electric current generator and having a motor shaft connected to a load for propelling said vehicle, said method comprising the steps of:

generating a first signal representing the position of said speed control element;

generating a second signal representing the speed of said output shaft;

comparing said first and second signal and generating a first output signal;

generating a motor shaft speed signal and applying said motor shaft speed signal to a speed controller together with an integrator signal representing the position of a pedal connected with said speed control emelement to generate a second output signal;

applying said second output signal to a current controller together with a further signal representing the current flow between said generator and said motor to produce a third output signal;

applying said first and third output signals to a power controller to generate a fourth output signal;

connecting said fourth output signal to a train of pulses; and controlling the flow of current through a field coil of said generator to selectively excite said generator with said train of pulses.

22. A method of operating a drive set for a vehicle comprising an internal combustion engine, a direct current generator driven by said engine and having a separate excitation current source, a direct current motor energized by said direct current generator and having a separate excitation current source, and an accelerator pedal for said set for producing a setpoint signal controlling said generator, said method comprising:

generating a signal dependent upon an armature current of said motor; and directly controlling the excitation of said motor with said signal dependent upon said armature current.

* * * * *